US010757853B2

(12) United States Patent
Nuhn (10) Patent No.: US 10,757,853 B2
(45) Date of Patent: Sep. 1, 2020

(54) FOLDING INJECTOR BOOM FOR LIQUID MANURE SPREADER

(71) Applicant: Nuhn Industries Ltd., Sebringville (CA)

(72) Inventor: Ian Nuhn, Sebringville (CA)

(73) Assignee: Nuhn Industries Ltd., Sebringville (CA)

( * ) Notice: Subject to any disclaimer, the term of this patent is extended or adjusted under 35 U.S.C. 154(b) by 136 days.

(21) Appl. No.: 16/216,511

(22) Filed: Dec. 11, 2018

(65) Prior Publication Data

US 2019/0174664 A1 Jun. 13, 2019

Related U.S. Application Data

(60) Provisional application No. 62/597,209, filed on Dec. 11, 2017.

(51) Int. Cl.

| A01B 73/04 | (2006.01) |
|---|---|
| A01B 15/18 | (2006.01) |
| A01B 49/06 | (2006.01) |
| A01C 23/02 | (2006.01) |
| A01C 3/06 | (2006.01) |
| A01C 5/06 | (2006.01) |
| A01C 23/00 | (2006.01) |

(52) U.S. Cl.
CPC ............ *A01B 73/048* (2013.01); *A01B 15/18* (2013.01); *A01B 49/06* (2013.01); *A01B 73/044* (2013.01); *A01C 3/06* (2013.01); *A01C 5/064* (2013.01); *A01C 23/008* (2013.01); *A01C 23/021* (2013.01)

(58) Field of Classification Search
CPC ..... A01B 73/044; A01B 73/048; A01B 49/06; A01C 3/06; A01C 15/00
See application file for complete search history.

(56) References Cited

U.S. PATENT DOCUMENTS

| 3,395,503 A | 8/1968 | Grenburg et al. |
|---|---|---|
| 4,344,572 A | 8/1982 | Tyler |
| 4,394,968 A | 7/1983 | Tyler |
| 5,178,328 A | 1/1993 | Broyhill |
| 7,581,503 B2 | 9/2009 | Martin et al. |
| 9,010,451 B2 | 4/2015 | Dames et al. |
| 9,769,980 B1 | 9/2017 | Reed |
| 2010/0025056 A1 | 2/2010 | Friggstad |

(Continued)

FOREIGN PATENT DOCUMENTS

| CA | 2542698 A1 | 10/2007 |
|---|---|---|
| DE | 3733488 A1 | 4/1989 |

(Continued)

*Primary Examiner* — Tara Mayo-Pinnock
(74) *Attorney, Agent, or Firm* — Brunet & Co. Ltd.; Robert Brunet; Hans Koenig (57) ABSTRACT

A liquid manure spreader includes a spreader vehicle, a transversely extending injector boom having at least one outer boom section pivotable between a transversely-oriented position and a vertically-oriented position, at least one first actuatable linkage assembly for translating the boom vertically between a lowered working position and a raised position, and at least one second actuatable linkage assembly for arcuately pivoting the boom about an axis parallel to the transverse axis between a highest vertical height position and a lower transport position when the boom is in the raised position and the at least one outer boom section is in the vertically-oriented position.

18 Claims, 10 Drawing Sheets

(56) References Cited

U.S. PATENT DOCUMENTS

2017/0027103 A1 2/2017 Grotelueschen et al.
2018/0054948 A1 3/2018 Dietrich

FOREIGN PATENT DOCUMENTS

| FR | 2583261 A1 | 12/1986 |
|----|------------|---------|
| GB | 2251166 A | 7/1992 |
| SE | 520547 | 4/2000 |

Fig. 6

FOLDING INJECTOR BOOM FOR LIQUID MANURE SPREADER

CROSS-REFERENCE TO RELATED APPLICATIONS

This application claims the benefit of U.S. patent application 62/597,209, filed Dec. 11, 2017, the entire contents of which are hereby incorporated by reference.

FIELD

This application relates to agricultural equipment, in particular to liquid manure spreaders.

BACKGROUND

A liquid manure spreader may be equipped with an injector boom mounted at a rear of a spreader vehicle, the injector boom extending transversely to either side of the vehicle with respect to the direction of travel of the vehicle when the spreader is operating. Liquid manure can be pumped from a tank through hoses to injectors mounted at transversely spaced locations along the boom. The boom may be divided into boom sections whereby outer boom sections may be folded up into vertical orientations to reduce the transverse profile of the spreader to permit driving the spreader vehicle on roadways between job sites.

However, particularly on large spreaders where the boom is quite long, folding the outer boom sections vertically results in the outer boom segments extending too far upward, creating a large vertical profile, which can interfere with overhead wires or prevent passage of the spreader through a door of a storage or maintenance building.

There remains a need to reduce the vertical profile of a liquid manure spreader when an injector boom of the spreader is folded vertically in a transport position.

SUMMARY

There is provided a liquid manure spreader comprising: a spreader vehicle having a longitudinal axis parallel to direction of travel of the vehicle, a horizontally-oriented transverse axis perpendicular to the longitudinal axis and a vertical axis perpendicular to the longitudinal and transverse axes; a transversely extending injector boom mounted on the spreader vehicle, the boom comprising at least one outer boom section pivotable between a transversely-oriented position and a vertically-oriented position; at least one first actuatable linkage assembly connecting the boom to the vehicle, actuation of the at least one first linkage assembly translating the boom vertically between a lowered working position and a raised position; and, at least one second actuatable linkage assembly connecting the boom to the vehicle, actuation of the at least one second linkage assembly when the boom is in the raised position and the at least one outer boom section is in the vertically-oriented position causing the boom to pivot arcuately about an axis parallel to the transverse axis, the boom pivoting arcuately between a highest vertical height position of the at least one outer boom section and a transport position in which the at least one outer boom section has a lower vertical height in relation to the ground than when the at least one outer boom section is in the highest vertical height position.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

The liquid manure spreader may comprise a spreader vehicle and a transversely extending injector boom mounted on the spreader vehicle. The spreader vehicle may be a trailer or an independently drivable vehicle such as a truck or a tractor. The spreader vehicle may comprise a tank to contain liquid manure, the tank equipped with at least one tank inlet to permit filling the tank and at least one tank outlet to permit delivery of the liquid manure to the boom. The tank inlet and tank outlet may be separate ports or the same port. The spreader vehicle may further comprise a pump for pumping the liquid manure from the tank to the boom.

The transversely extending injector boom may be mounted at a rear, at a front or somewhere between the front and rear of the spreader vehicle. If mounted at the rear of the vehicle, the boom may pivot arcuately forward into the transport position from the highest vertical height position. If mounted at the front of the vehicle, the boom may pivot arcuately rearward into the transport position from the highest vertical height position. If mounted between the front and the rear of the vehicle, the boom may pivot arcuately forward or rearward, or may be designed to selectively pivot either forward or rearward. Preferably, the boom is mounted at the rear of the vehicle.

The boom comprises at least one outer boom section pivotable between a transversely-oriented position and a vertically-oriented position. Preferably, the boom comprises two outer boom sections, one extending transversely to each side of the spreader vehicle when the boom is in the working position. Preferably, the boom comprises a non-folding boom section on which the at least one outer boom section is pivotably mounted. The non-folding boom section may be a central boom section located along the longitudinal axis of the spreader vehicle. Preferably, the least one outer boom section comprises two outer boom sections situated at opposite ends of the central boom section. Each outer boom section comprises a proximal end connected to the central boom section and a distal end opposite the proximal end. Preferably through the non-folding boom section, the boom may be vertically translatable between the lowered working position and a raised position in order to engage and disengage boom elements with the ground.

The at least one outer boom section is pivotable between the transversely-oriented position and the vertically-oriented position. The at least one outer boom section may be pivotable about a substantially longitudinally-oriented pivot axis. Pivoting about a substantially longitudinally-oriented pivot axis permits folding up of the at least one outer boom section into the vertically-oriented position to provide a narrower transverse profile for the spreader. In the vertically-oriented position, the distal end of the outer boom section is at a height greater than the proximal end of the outer boom section. The at least one outer boom section may be pivoted by use of one or more actuators. The one or more actuators may be mounted on the at least one outer boom section and the non-folding boom section. Any suitable actuator may be employed, for example a hydraulic cylinder (e.g. a dual-acting hydraulic cylinder), an electric linear actuator, a pneumatic actuator, a mechanical actuator and the like. In one embodiment, one or more boom section hydraulic cylinder may be pivotally connected to the least one outer boom section and a non-folding boom section.

The boom may comprise a plurality of injector nozzles transversely spaced-apart along the boom. When the boom is in the lowered working position, the injector nozzles are positioned to inject liquid manure into the ground. A main hose connects the tank outlet to a distributor inlet of a liquid manure distributor mounted on the boom. Individual delivery hoses from a plurality of distributor outlets of the distributor deliver liquid manure to the injector nozzles at different transverse locations on the boom. The boom may also comprise soil working tools, for example coulter wheels, disc harrows, tine harrows, shanks, chisel plows and the like, to prepare the ground to receive the liquid manure.

The first and second actuatable linkage assemblies may be completely separate assemblies having no common linkages, or the first and second actuatable linkage assemblies may share one or more common linkages. In both cases, the first and second actuatable linkage assemblies act separately. The first actuatable linkage assembly serves primarily to translate the boom vertically between the lowered working position and the raised position prior to pivoting the at least one outer boom section into the vertically-oriented position. During translation between the lowered working position and the raised position, the boom does arcuately pivot about a transversely-oriented axis; but, once the at least one outer boom section is pivoted into the vertically-oriented position, the at least one outer boom section is still substantially vertically oriented. Once the at least one outer boom section has been pivoted into the vertically-oriented position, the second actuatable linkage assembly serves to pivot the boom arcuately around a different transversely-oriented axis. Actuation of the second linkage assembly pivots the boom between the highest vertical height position of the at least one outer boom section, wherein the distal end is at its highest vertical height, and the transport position. In the transport position, the at least one outer boom section is substantially horizontally oriented, which includes an angle from about 0 to about 45 degrees relative to horizontal, an angle from about 0 to about 30 degrees relative to horizontal or an angle from about 0 to about 15 degrees relative to horizontal. An at least one outer boom section support located on the spreader vehicle helps support the weight of the substantially horizontally-oriented at least one outer boom section when the boom is in the transport position.

In one embodiment, the at least one second linkage assembly may comprise a four-bar quadrilateral linkage mechanism. The four-bar linkage mechanism may include a first linkage rigidly mounted on the spreader vehicle, a second linkage pivotally connected to the first linkage, a third linkage rigidly mounted on the boom and pivotally connected to the second linkage, and a fourth linkage pivotally connected to the third and first linkages. The first linkage is preferably rigidly mounted on a frame of the spreader vehicle. The frame of the vehicle may act as the first linkage, or the first linkage may be a mount attached to the vehicle, preferably the frame. The third linkage is preferably rigidly mounted on a non-folding boom section. The non-folding boom section may act as the third linkage, or the third linkage may be a mount attached to the boom, preferably the non-folding boom section. When the boom is mounted at the rear of the vehicle, the second and fourth linkages may extend rearwardly of the vehicle connecting the first linkage to the third linkage, thereby assisting in mounting the boom to the vehicle.

The second or fourth linkage may be length adjustable. Adjusting length of the second or fourth linkage causes the boom to pivot arcuately about the axis parallel to the transverse axis. The second or fourth linkage may comprise an actuator. Any suitable actuator may be employed, for example a hydraulic cylinder (e.g. a dual-acting hydraulic cylinder), an electric linear actuator, a pneumatic actuator, a mechanical actuator and the like. In one embodiment, the second linkage is situated vertically lower than the fourth linkage, the second linkage comprises a second linkage assembly dual-acting hydraulic cylinder, the fourth linkage comprises a non-extensible bar, and extension of the second linkage assembly hydraulic cylinder pivots the boom arcuately forward. The at least one second linkage assembly may comprise one second linkage assembly or a plurality of transversely spaced-apart second linkage assemblies, for example two, three, four or more second linkage assemblies. The plurality of transversely spaced-apart second linkage assemblies may be actuatable in unison to provide even pivoting along a length of the boom.

The at least one actuatable first linkage assembly connects the boom to the vehicle and assists with mounting the boom on the vehicle. Preferably, the at least one actuatable first linkage assembly is mounted on the frame of the vehicle. Preferably, the at least one actuatable first linkage assembly is mounted on the non-folding boom section. Preferably, the at least one actuatable first linkage assembly is pivotably mounted on the vehicle and the boom to permit some arcuate translation of the boom during operation of the at least one actuatable first linkage assembly. The at least one first linkage assembly may comprise one first linkage assembly or a plurality of transversely spaced-apart first linkage assemblies, for example two, three, four or more first linkage assemblies. The plurality of transversely spaced-apart first linkage assemblies may be actuatable in unison to provide even vertical translation of the boom along the length of the boom. The at least one actuatable first linkage assembly may comprise a length adjustable linkage. Adjusting length of the length adjustable linkage raises and lowers the boom. The length adjustable linkage may comprise an actuator. Any suitable actuator may be employed, for example a hydraulic cylinder (e.g. a dual-acting hydraulic cylinder), an electric linear actuator, a pneumatic actuator, a mechanical actuator and the like. The actuator of the length adjustable linkage is a different actuator from the actuator of the second or fourth linkages of the second linkage assembly.

As indicated above, the first and second actuatable linkage assemblies may share one or more common linkages, but still act separately. In one embodiment, the at least one second linkage assembly comprises the four-bar quadrilateral linkage mechanism, the four-bar linkage mechanism including the first linkage rigidly mounted on the vehicle, the second linkage pivotally connected to the first linkage, the third linkage rigidly mounted on the boom and pivotally connected to the second linkage, and the fourth linkage pivotally connected to the third and first linkages, wherein the second or fourth linkage is length adjustable to cause the boom to pivot arcuately about the axis parallel to the transverse axis. The at least one first linkage assembly comprises another four-bar quadrilateral linkage mechanism, the other four-bar linkage mechanism including the first linkage, the second linkage, the third linkage and a fifth linkage pivotally connected to the first and third linkages, wherein the fifth linkage is length actuatable to translate the boom vertically between the lowered working position and the raised position without actuating the second linkage assembly. When the boom is mounted at the rear of the vehicle, the second, fourth and fifth linkages may extend rearwardly of the vehicle connecting the first linkage to the third linkage, thereby assisting in mounting the boom to the vehicle.

In a one embodiment where the first and second actuatable linkage assemblies share one or more common linkages, the second linkage may be situated vertically lower than the fourth linkage; the second linkage may comprise a second linkage assembly dual-acting hydraulic cylinder; the fourth linkage may comprise a non-extensible bar; and, extending the second linkage assembly hydraulic cylinder may pivot the boom arcuately forward. The fifth linkage may be situated vertically between the second and fourth linkages, the fifth linkage comprising a first linkage assembly dual-acting hydraulic cylinder, and extending the first linkage assembly dual-acting hydraulic cylinder while the second linkage assembly hydraulic cylinder remains unactuated may raise the boom from the lowered position.

Referring to the Figures, in one embodiment, a liquid manure spreader 1 comprises a trailer 2 having a trailer frame 3 with a liquid manure storage tank 4 supported on the frame 3, and a transversely-oriented folding injector boom 20 mounted on the frame 3 at a rear of the trailer 2. Mounted on the boom 20 are a plurality of transversely spaced-apart coulter wheels 21 (only one labeled) and disc harrows 22 (only one labeled) used to work the soil to facilitate injection of liquid manure into the soil through a plurality of injector nozzles 23 (only one labeled) mounted together with the coulter wheels 21 and disc harrows 22. The coulter wheels 21, disc harrows 22 and injector nozzles 23 are mounted on the boom 20 through tool mounts 24 (only one labeled). Referring especially to FIG. 6, liquid manure is pumped from the tank 4 through a tank outlet 5 and into main hose 6 connecting the tank outlet 5 to a distributor inlet 7 of a multi-outlet manure distributor 8 mounted on the boom 20. Liquid manure pumped into the distributor 8 is pumped out of the distributor 8 through a plurality of distributor outlets 9 (only one labeled) into a plurality of nozzle hoses 11 (only one labeled) connecting the distributor outlets 9 to the injector nozzles 23. The hoses 6 and 9 are omitted from FIGS. 1-5 for clarity.

The boom 20 comprises two outer sections 50 pivotably mounted on a central section 30 at opposite ends of the central section 30. The boom 20 is mounted on the frame 3 of the trailer 2 by two sets of transversely spaced-apart linkages. The two sets of linkages are preferably situated substantially equidistant from a longitudinal center line of the trailer 2 on either side of the longitudinal center line to provide balance and stability for the boom 20 mounted on the trailer 2. Each set of linkages comprises a frame mount 31 rigidly attached to the frame 3 and a boom mount 33 rigidly attached to central section 30 of the boom 20. Each set of linkages further comprises three linkages 32, 41, 42 connecting the boom mount 33 to the frame mount 31, thereby mounting the boom 20 on the frame 3. The linkage 32 is a generally longitudinally-oriented first dual-acting hydraulic cylinder pivotably mounted to the frame mount 31 at one end and pivotably mounted to the boom mount 33 at the other end. The linkage 42 is a generally longitudinally-oriented second dual-acting hydraulic cylinder pivotably mounted to the frame mount 31 at one end and pivotably mounted to the boom mount 33 at the other end. The linkage 41 is a rigid linkage pivotably mounted to the frame mount 31 at one end and pivotably mounted to the boom mount 33 at the other end. While the linkage 41 is shown as a rigid bar, the linkage 41 could also be a hydraulic cylinder or other element, provided the linkage 41 can remain rigid without articulating or changing length. The linkages 32, 41, 42 are vertically spaced-apart such that the linkage 32 is situated vertically lower than the linkage 41, but vertically higher than the linkage 42. The three linkages 32, 41, 42 are pivotally mounted on the frame mount 31 at vertically spaced-apart pivot structures (e.g. pivot pins) 32*a*, 41*a*, 42*a*, respectively, with the pivot structure 32*a* situated vertically lower than the pivot structure 41*a* and vertically higher than the pivot structure 42*a*. On the boom mount 33, the linkages 32 and 41 are mounted at the pivot structures 32*b*, 41*b*, respectively, which are at or close to the same vertical height, while the linkage 42 is mounted at the pivot structure 42*b* at a lower vertical height than the pivot structures 32*b*, 41*b*. The pivot structures 32*b*, 41*b* may be the same structure.

While each set of linkages comprises five connected 'bars', there are two functionally distinct four-bar quadrilateral linkage assemblies within a set of linkages, each four-bar assembly having different functions, despite the two distinct linkage assemblies sharing common linkages. A first linkage assembly comprises the frame mount 31, the boom mount 33, the first hydraulic cylinder 32 and the second hydraulic cylinder 42. As explained in further detail below, the first linkage assembly is responsible for translating the boom 20 between a lowered working position and a raised position. In the operation of the first linkage assembly, the first hydraulic cylinder 32 is actuated, while the length of the second hydraulic cylinder 42 remains unchanged. A second linkage assembly comprises the frame mount 31, the boom mount 33, the second hydraulic cylinder 42 and the rigid linkage 41. As explained in further detail below, the first linkage assembly is responsible for pivoting the boom 20 between the raised position when the outer sections 50 are folded up and a transport position. In the operation of the second linkage assembly, the second hydraulic cylinder 42 is actuated.

The two outer sections 50 of the boom 20 are pivotably mounted on the central section 30 by pivot structures 51 (e.g. pivot pins or the like), the outer sections 50 pivotable about longitudinally-oriented axes through the pivot structures 51. Two generally transversely-oriented dual-acting hydraulic cylinders 52, both mounted on the central section 30 and one mounted on each of the outer sections 50, are utilized to pivot the outer sections 50 between a transversely-oriented unfolded position (FIG. 2A) and a vertically-oriented folded position (FIG. 3A) when the boom 20 is in the raised position. The central section 30 does not fold up, remaining transversely-oriented.

Operation of the boom 20 will now be described with reference to FIG. 1A, FIG. 1B, FIG. 2A, FIG. 2B, FIG. 3A, FIG. 3B, FIG. 4A, FIG. 4B, FIG. 5A, FIG. 5B and FIG. 5C.

Figure 1A:
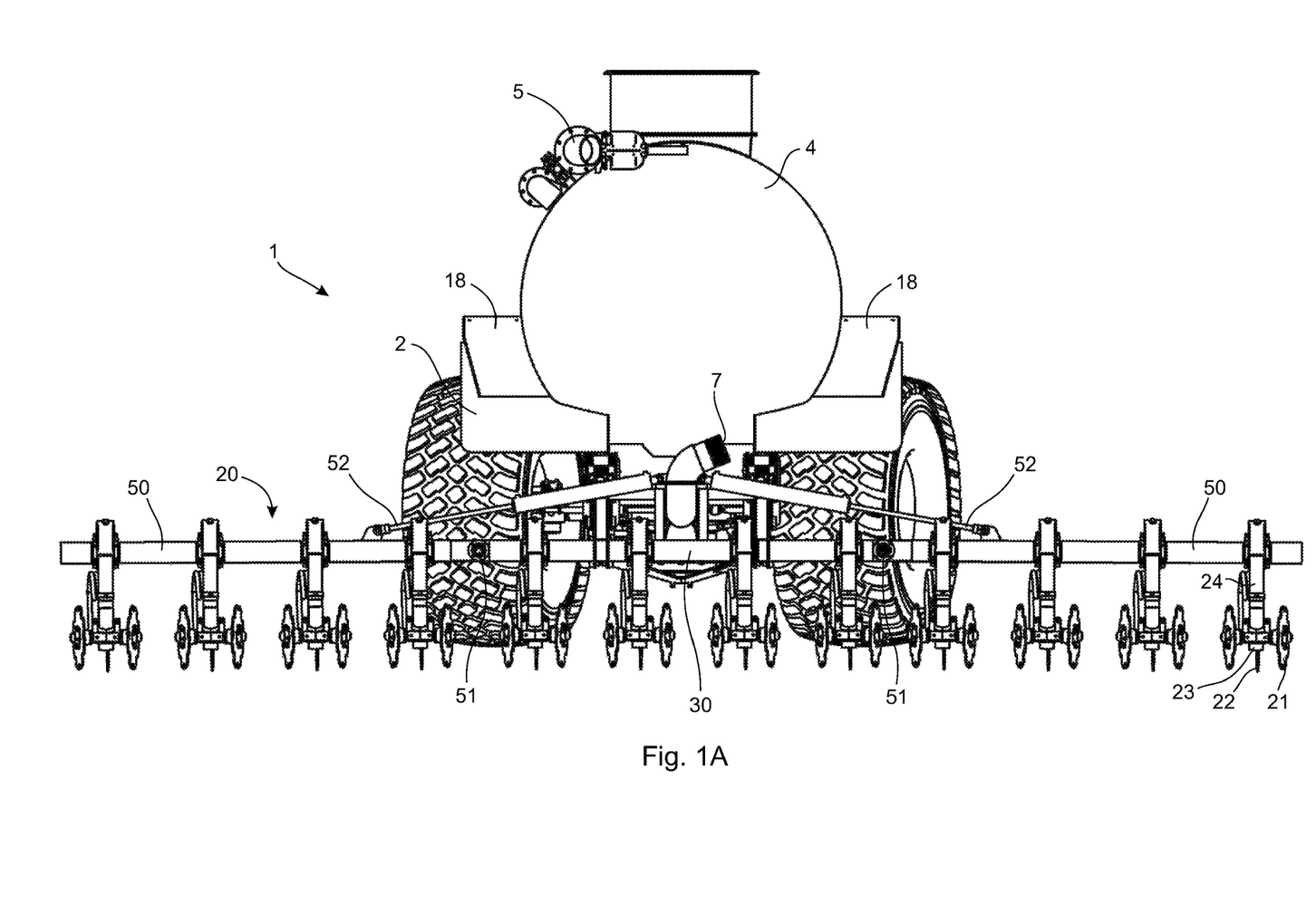
FIG. 1A is a rear end view of a liquid manure spreader having a transversely extending folding injector boom in an operating position.
Figure 1B:
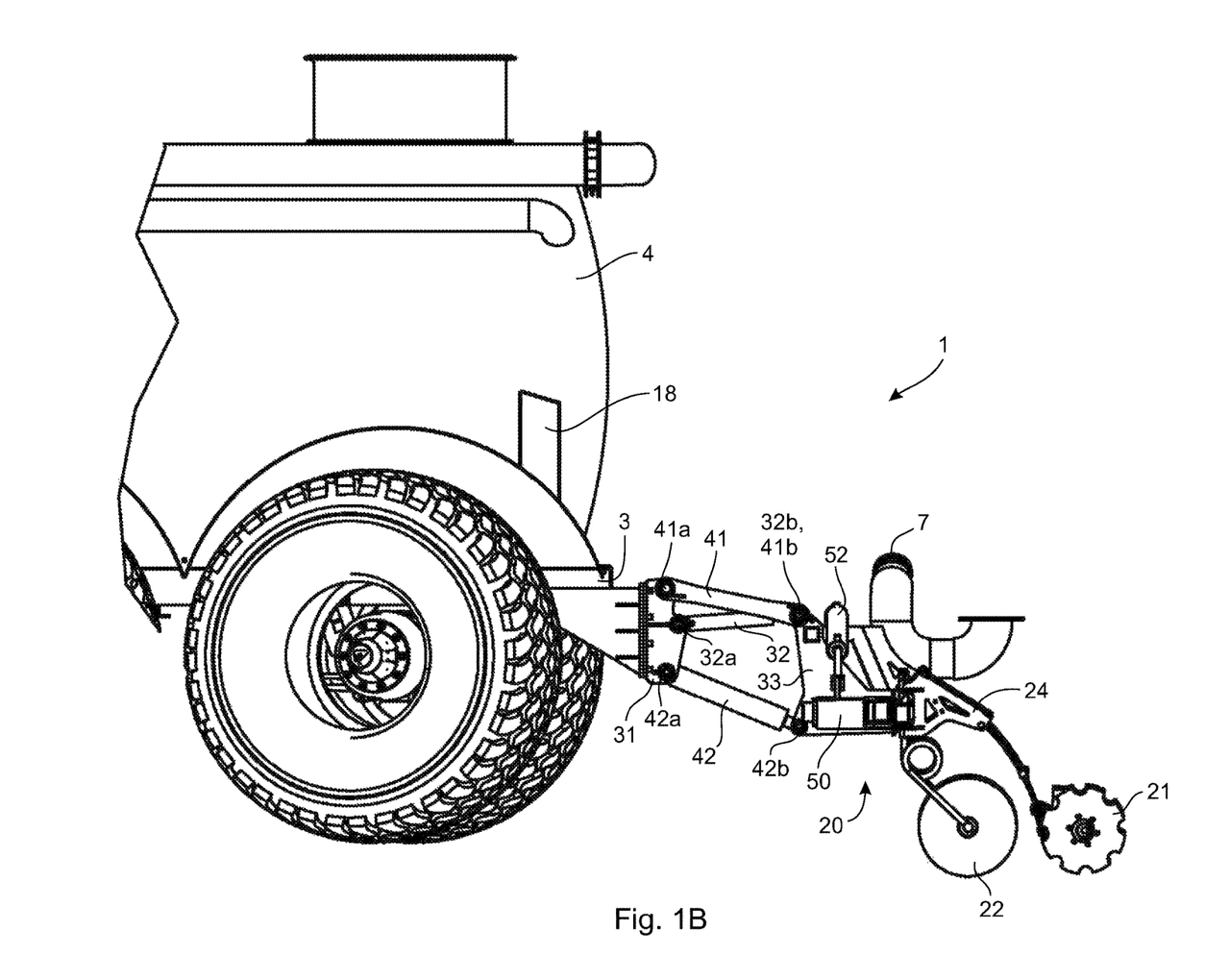
FIG. 1B is a side view of the rear end of the liquid manure spreader of FIG. 1A.
Figure 2A:
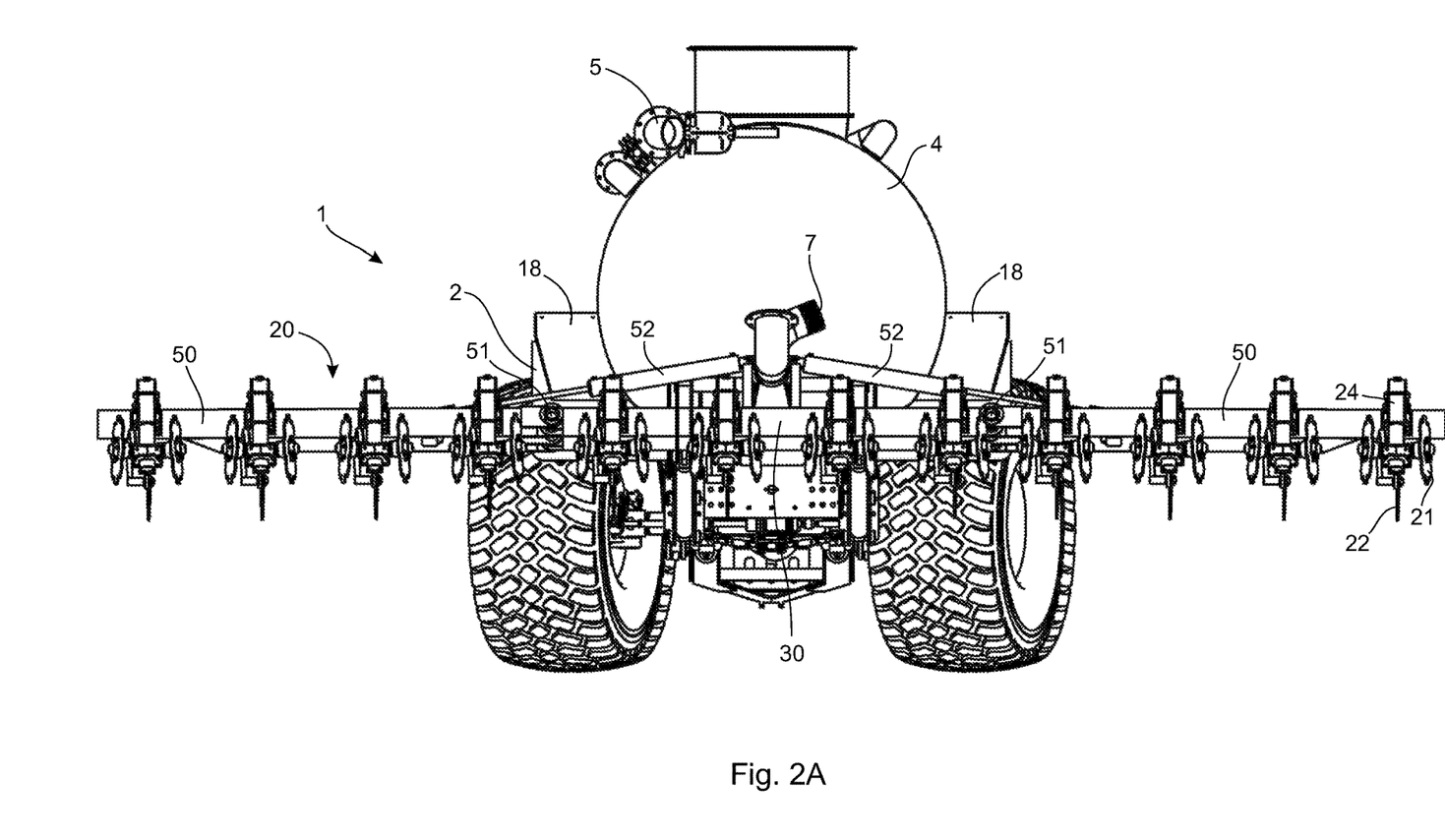
FIG. 2A is a rear end view of the liquid manure spreader of FIG. 1A with the boom raised vertically in preparation for folding outer boom segments.
Figure 2B:
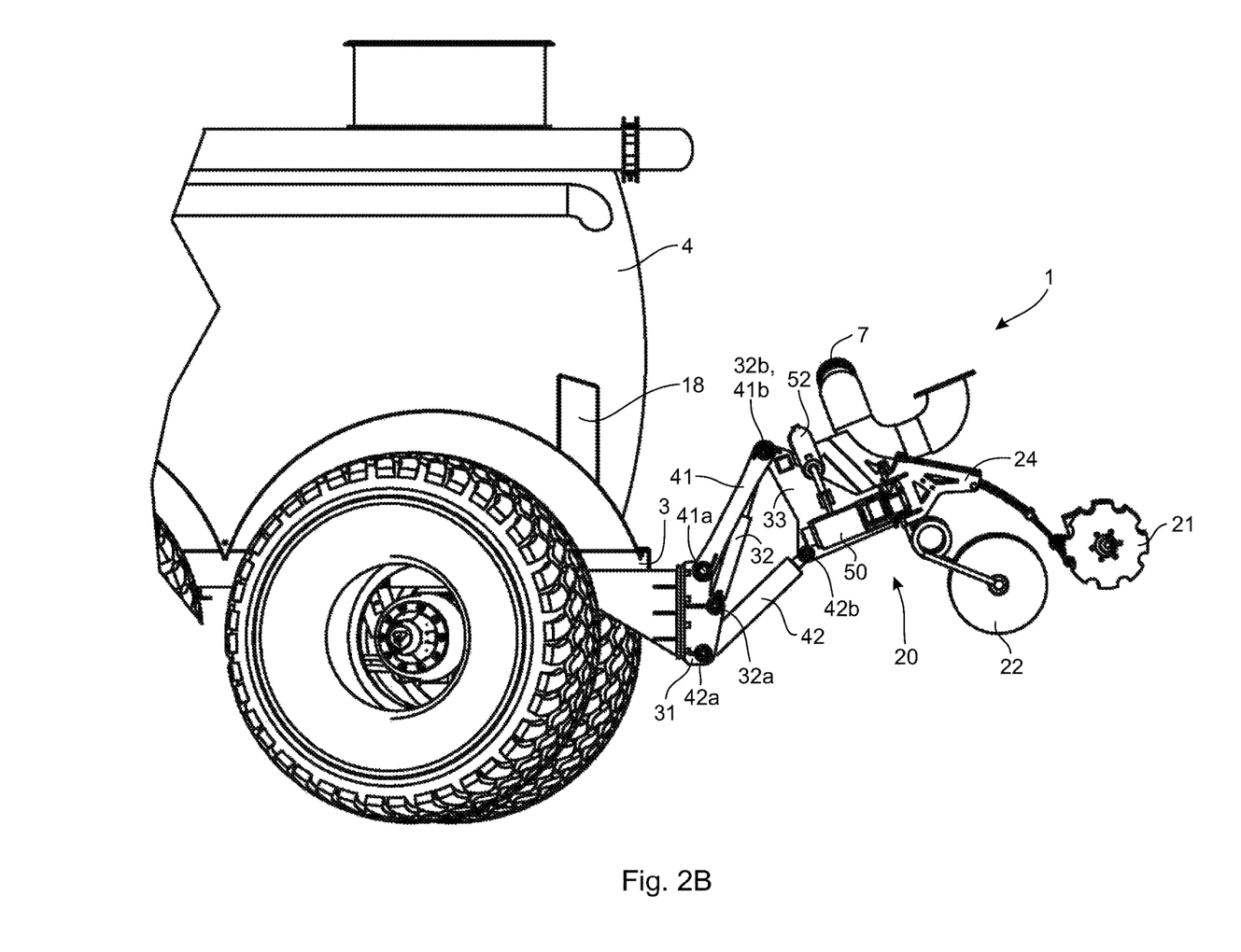
FIG. 2B is a side view of the rear end of the liquid manure spreader of FIG. 2A.
Figure 5A:
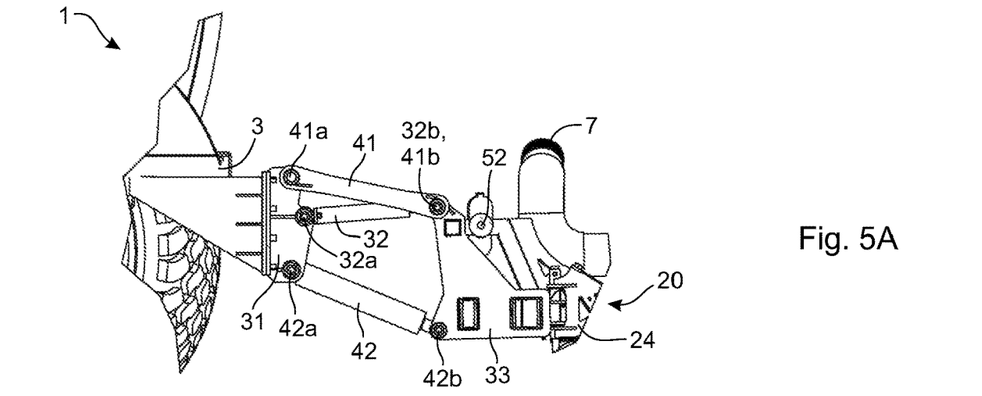
FIG. 5A is a side cross-sectional view of FIG. 1B illustrating linkages connecting the boom to a frame mounted on a vehicle when the boom is in the operating position.
Figure 5B:
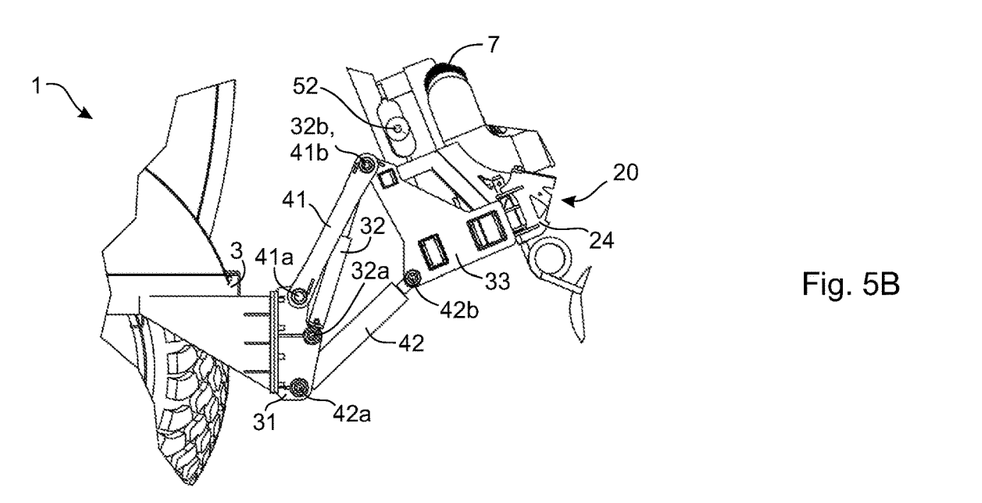
FIG. 5B is a side cross-sectional view of FIG. 3B illustrating linkages connecting the boom to a frame mounted on a vehicle when the boom is raised vertically and the outer boom segments are folded up.
Figure 6:
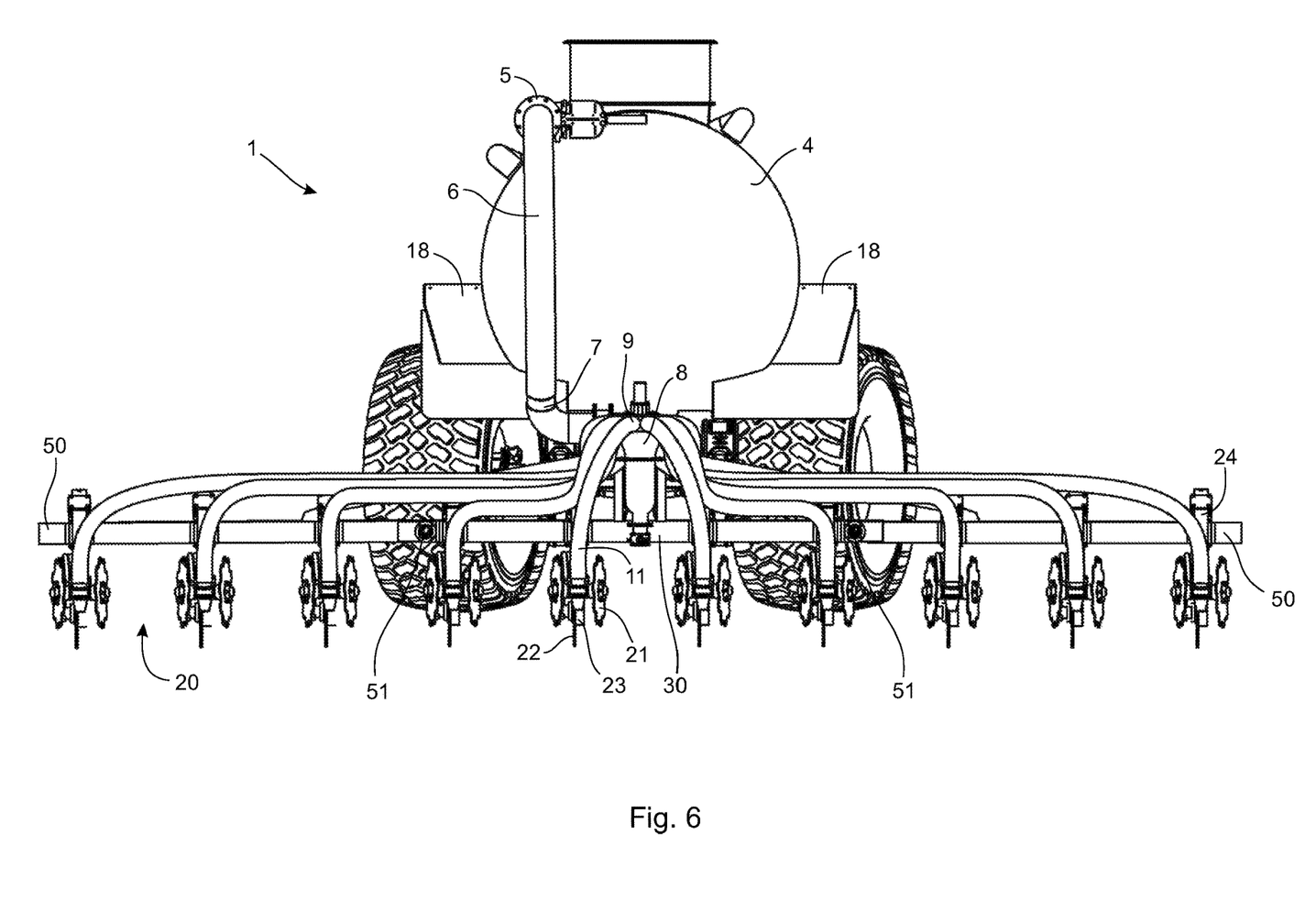

FIG. 1A, FIG. 1B and FIG. 5A depict the spreader 1 with the boom 20 in the working position, where the boom 20 is in a lowered position and the two outer sections 50 are unfolded in transversely-oriented positions so that the coulter wheels 21 and disc harrows 22 engage the soil and the injector nozzles 23 are positioned close to the soil to permit injection of liquid manure into the soil. When spreading liquid manure is complete and the spreader must be transported to a different location, the boom 20 must be moved into a transport position. As a first step, the boom 20 is raised from the working position into a raised position with the two outer sections 50 still unfolded in the transversely-oriented positions, as shown in FIG. 2A and FIG. 2B. As seen by comparing FIG. 1B to FIG. 2B, raising the boom 20 may be accomplished by extending, in unison, the first hydraulic cylinders 32 of both sets of linkages while keeping unchanged the length of the second hydraulic cylinders 42 of both sets of linkages. Extension of the first hydraulic cylinders 32 causes the boom 20 to rise as the three linkages 32, 41, 42 pivot about the pivot structures 32a, 41a, 42a, respectively, on the frame mount 31 and pivot about the pivot structures 32b, 41b, 42b, respectively, on the boom mount 33. As further seen by comparing FIG. 1B to FIG. 2B, the boom 20 also pivots forwardly about a transverse axis, but as can be seen in FIG. 3B, the forward pivoting of the boom 20 is not sufficient to lower the two outer sections 50 sufficiently when the two outer sections 50 are folded up. In addition, raising the boom 20 also may require some retraction of the generally transversely-oriented hydraulic cylinders 52.

Figure 3A:
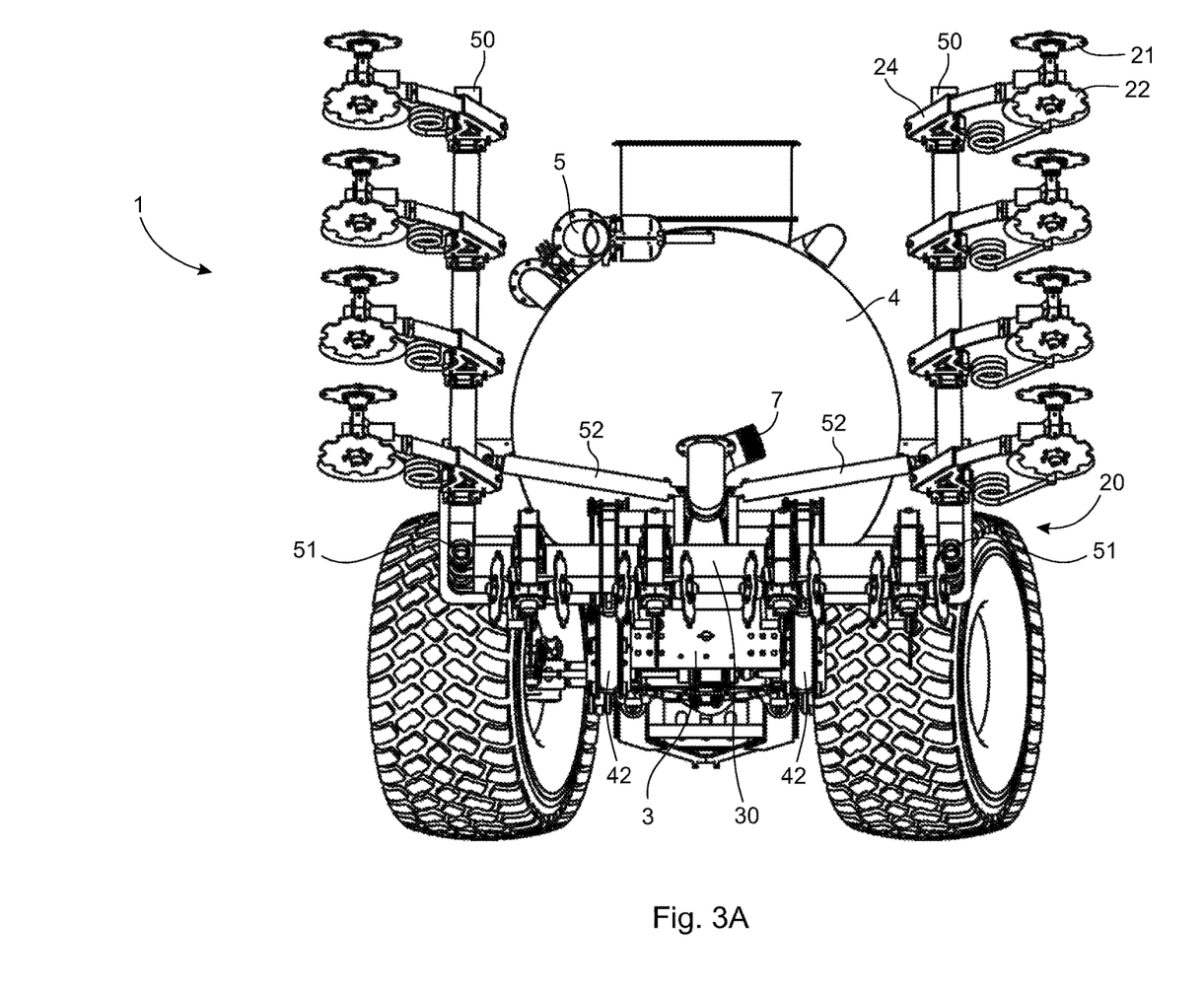
FIG. 3A is a rear end view of the liquid manure spreader of FIG. 2A with the outer boom segments folded up.
Figure 3B:
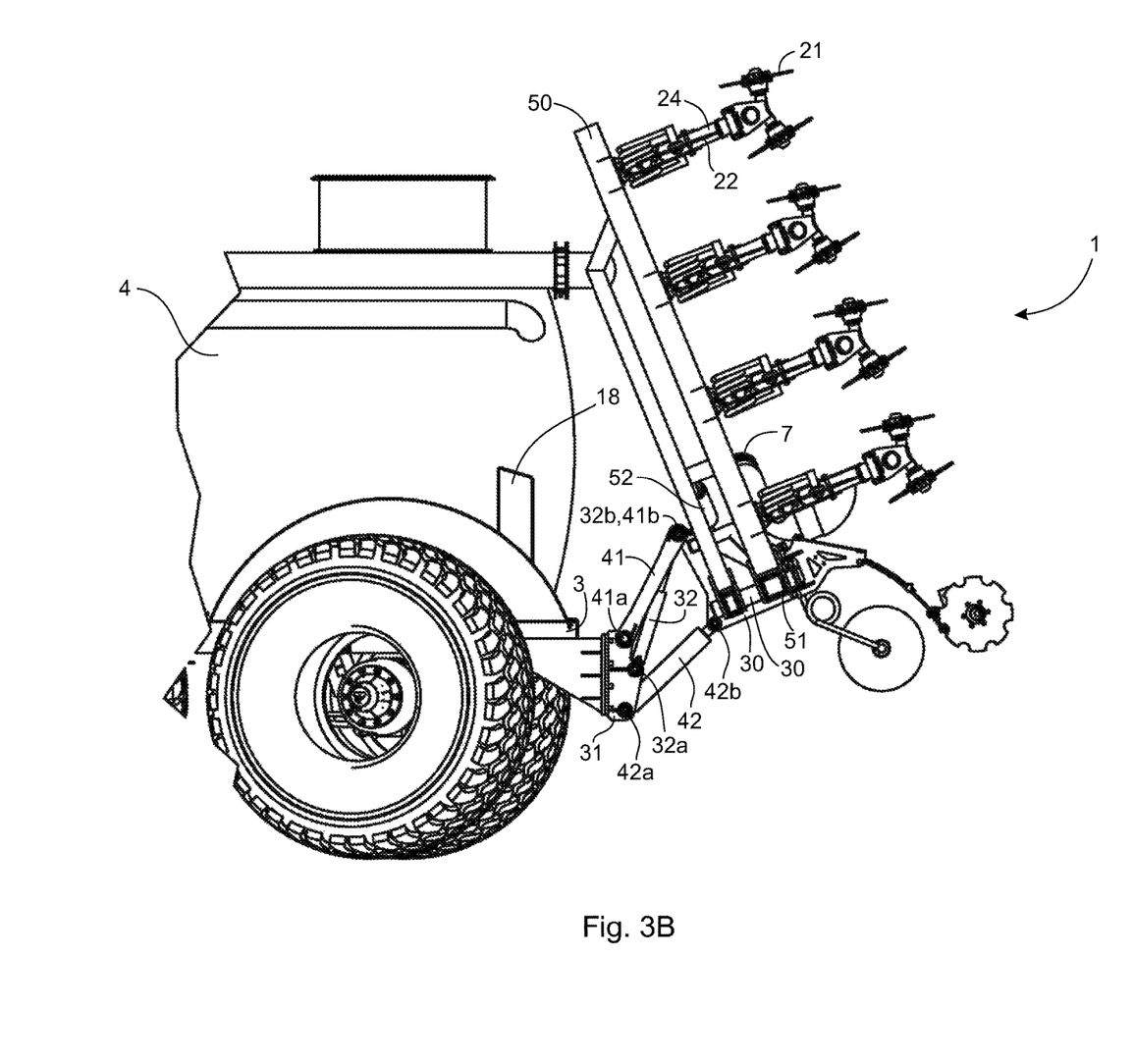
FIG. 3B is a side view of the rear end of the liquid manure spreader of FIG. 3A.

With the boom 20 raised and the two outer sections 50 still unfolded in the transversely-oriented positions (FIG. 2A and FIG. 2B), the two outer sections 50 are now pivoted upwardly into the vertically-oriented position, as seen by comparing FIG. 2A to FIG. 3A and FIG. 2B to FIG. 3B. As seen by comparing FIG. 2A to FIG. 3A, pivoting of the two outer sections 50 may be accomplished by further retracting the generally transversely-oriented hydraulic cylinders 52, which is preferably, but not necessarily, done in unison. As seen by comparing FIG. 2B to FIG. 3B or FIG. 5B, folding up the two outer sections 50 does not affect the relationship of the three linkages 32, 41, 42 to each other or to the boom mount 33 and the frame mount 31. As seen in FIG. 3A and FIG. 3B, although the transverse profile of the spreader 1 is much narrower with the two outer sections 50 folded up, the two outer sections 50 extend significantly higher than the height of the tank 4 on the trailer 2, which can lead to interference of the two outer sections 50 with overhead wires and the doors of buildings. Lowering the height of the two outer sections 50 is therefore desirable.

Figure 4A:
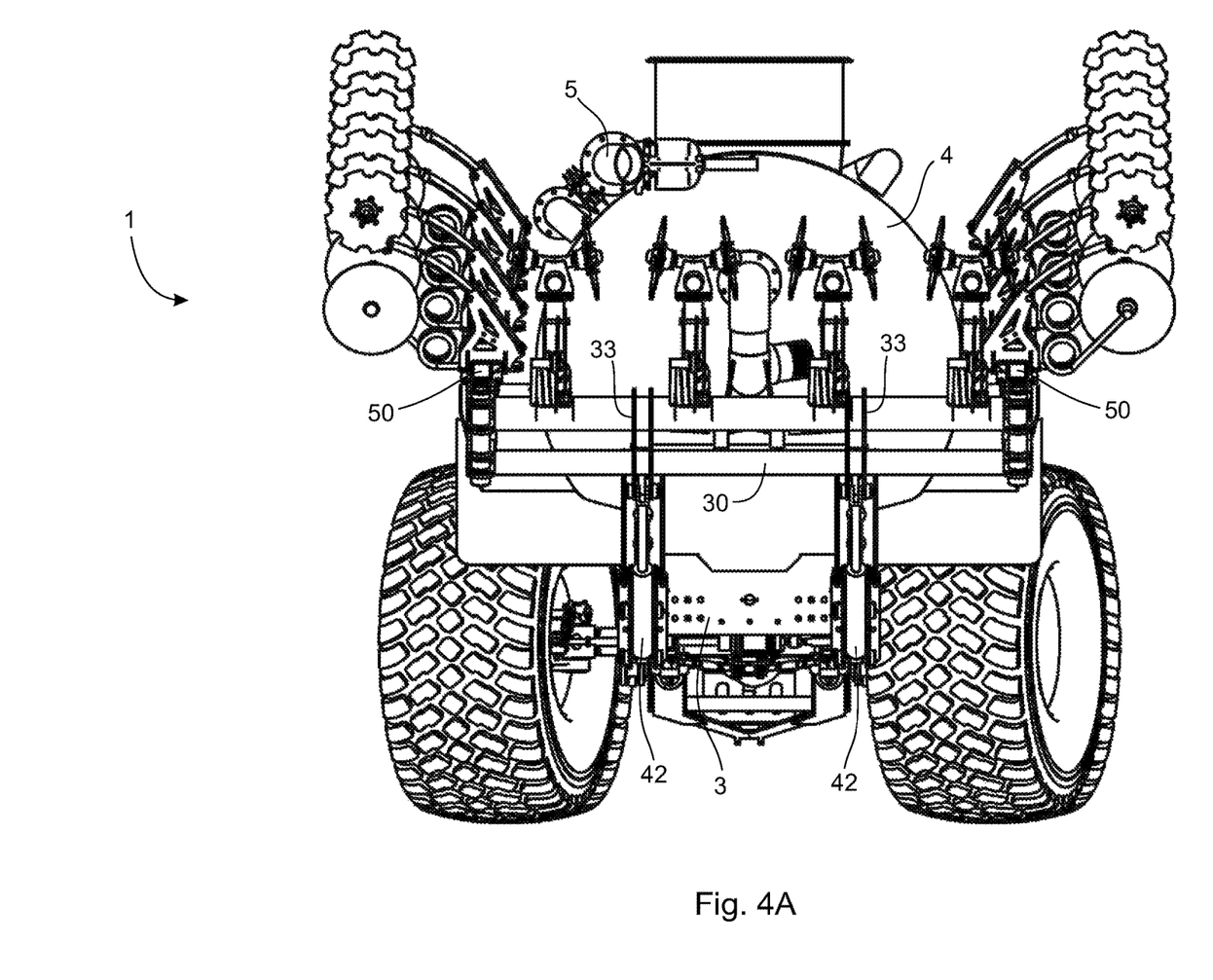
FIG. 4A is a rear end view of the liquid manure spreader of FIG. 3A with the boom rotated longitudinally forward in a transport position.
Figure 4B:
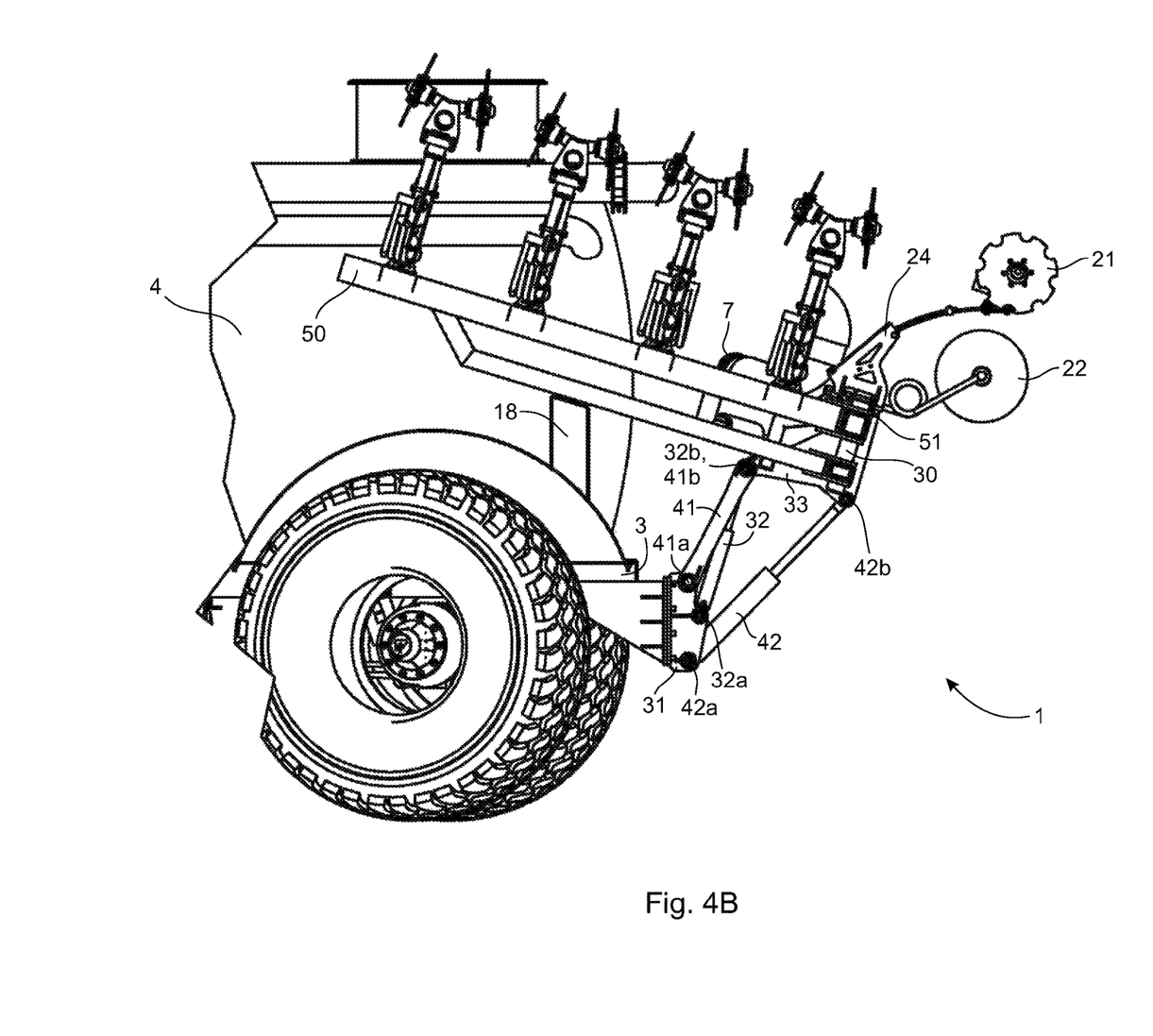
FIG. 4B is a side view of the rear end of the liquid manure spreader of FIG. 4A.
Figure 5C:
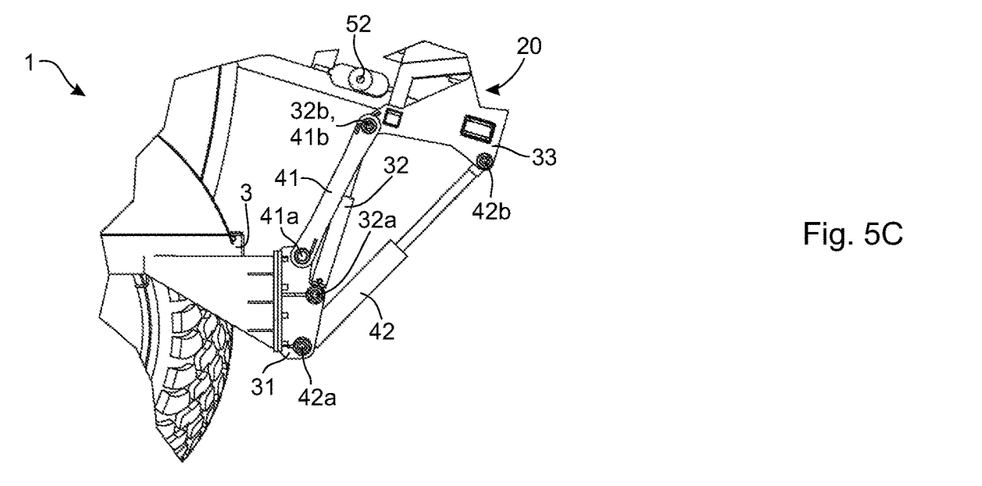
FIG. 5C is a side cross-sectional view of FIG. 4B illustrating linkages connecting the boom to a frame mounted on a vehicle when the boom is in the transport position; and, FIG. 6 is a rear view of the liquid manure spreader of FIG. 1A further showing a liquid manure distributor mounted on the transversely extending boom with liquid manure hoses connected thereto.

With the boom 20 raised and the two outer sections 50 in the vertically-oriented position (FIG. 3A, FIG. 3B and FIG. 5B), the height of the two outer sections 50 may be lowered by pivoting the entire boom 20 about a transversely-oriented axis into the transport position, as seen in FIG. 4A, FIG. 4B and FIG. 5C. As seen by comparing FIG. 3B to FIG. 4B or FIG. 5B to FIG. 5C, pivoting the boom 20 forward may be accomplished by extending, in unison, the second hydraulic cylinders 42 of both sets of linkages while keeping unchanged the length of the first hydraulic cylinders 32 of both sets of linkages. The relationships of the first hydraulic cylinders 32 and the rigid linkages 41 to each other and to the boom mount 33 and the frame mount 31 remain generally unchanged as the boom 20 pivots forward arcuately under the action of the second hydraulic cylinders 42. Extension of the second hydraulic cylinders 42 pushes the boom 20 upwardly at a rear edge of the central section 30 causing the entire boom 20 to pivot arcuately about a transversely oriented axis situated between the rear and front edges of the central section 30. The arcuate pivoting causes top ends of the vertically oriented outer sections 50 to move downwardly so that the two outer sections 50 become more horizontally and longitudinally oriented, as seen in FIG. 4B. The top ends of the two outer sections 50 in the transport position do not significantly extend beyond a top of the tank 4 (see FIG. 4B), providing a lower height profile for the spreader 1 when the boom 20 is in the transport position.

With the two outer sections 50 more horizontally and longitudinally oriented in the transport position, weight of the two outer sections 50 is no longer substantially over the sets of linkages, which may cause issues with overbalancing of the spreader 1 and/or stress on components of the boom 20 and/or trailer 2. To further support the two outer sections 50 while the boom 20 is in the transport position, the trailer 2 is provided with support structures 18 mounted on the trailer 2 at the sides of the tank 4. The support structures 18 provide complementary surfaces on which the outer sections 50 may rest on either side of the tank 4 when the boom 20 is in the transport position.

The order of operations may be reversed to return the boom 20 to the working position from the transport position.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A liquid manure spreader comprising:
    a spreader vehicle having a longitudinal axis parallel to direction of travel of the vehicle, a horizontally-oriented transverse axis perpendicular to the longitudinal axis and a vertical axis perpendicular to the longitudinal and transverse axes;
    a transversely extending injector boom mounted on the spreader vehicle, the boom comprising at least one outer boom section pivotable between a transversely-oriented position and a vertically-oriented position;
    at least one first actuatable linkage assembly connecting the boom to the vehicle, actuation of the at least one first linkage assembly translating the boom vertically between a lowered working position and a raised position; and, at least one second actuatable linkage assembly connecting the boom to the vehicle, actuation of the at least one second linkage assembly when the boom is in the raised position and the at least one outer boom section is in the vertically-oriented position causing the boom to pivot arcuately about an axis parallel to the transverse axis, the boom pivoting arcuately between a highest vertical height position of the at least one outer boom section and a transport position in which the at least one outer boom section has a lower vertical height in relation to the ground than when the at least one outer boom section is in the highest vertical height position.

2. The spreader of claim 1, wherein the boom is mounted at a rear of the vehicle and the boom pivots arcuately forward from the highest vertical height position to the transport position.

3. The spreader of claim 1, wherein the at least one second linkage assembly comprises a four-bar quadrilateral linkage mechanism, the four-bar linkage mechanism including a first linkage rigidly mounted on the vehicle, a second linkage pivotally connected to the first linkage, a third linkage rigidly mounted on the boom and pivotally connected to the second linkage, and a fourth linkage pivotally connected to the third and first linkages, wherein the second or fourth linkage is length adjustable to cause the boom to pivot arcuately about the axis parallel to the transverse axis.

4. The spreader of claim 3, wherein the second and fourth linkages extend rearwardly of the vehicle connecting the first and third linkages.

5. The spreader of claim 3, wherein the second or fourth linkage of the at least one second linkage assembly comprises a second linkage assembly dual-acting hydraulic cylinder.

6. The spreader of claim 3, wherein the second linkage is situated vertically lower than the fourth linkage, the second linkage comprises a second linkage assembly dual-acting hydraulic cylinder, the fourth linkage comprises a non-extensible bar, and extension of the second linkage assembly hydraulic cylinder pivots the boom arcuately forward.

7. The spreader of claim 1, wherein the at least one second linkage assembly comprises two transversely spaced-apart second linkage assemblies, which are actuatable in unison.

8. The spreader of claim 1, wherein the vehicle comprises at least one outer boom section support on which the at least one outer boom section is supported when the boom is in the transport position.

9. The spreader of claim 1, wherein the at least one actuatable first linkage assembly comprises a first linkage assembly dual-acting hydraulic cylinder.

10. The spreader of claim 9, wherein the at least one actuatable first linkage assembly comprises two transversely spaced-apart actuatable first linkage assemblies, which are actuatable in unison.

11. The spreader of claim 1, wherein:
the at least one second linkage assembly comprises a four-bar quadrilateral linkage mechanism, the four-bar linkage mechanism including a first linkage rigidly mounted on the vehicle, a second linkage pivotally connected to the first linkage, a third linkage rigidly mounted on the boom and pivotally connected to the second linkage, and a fourth linkage pivotally connected to the third and first linkages, wherein the second or fourth linkage is length adjustable to cause the boom to pivot arcuately about the axis parallel to the transverse axis; and,
the at least one first linkage assembly comprises another four-bar quadrilateral linkage mechanism, the other four-bar linkage mechanism including the first linkage, the second linkage, the third linkage and a fifth linkage pivotally connected to the first and third linkages, wherein the fifth linkage is length actuatable to translate the boom vertically between the lowered working position and the raised position without actuating the second linkage assembly.

12. The spreader of claim 11, wherein:
the second, fourth and fifth linkages extend rearwardly of the vehicle connecting the first and third linkages;
the second linkage is situated vertically lower than the fourth linkage, the second linkage comprising a second linkage assembly dual-acting hydraulic cylinder, the fourth linkage comprising a non-extensible bar, and extending the second linkage assembly hydraulic cylinder pivots the boom arcuately forward;
the fifth linkage is situated vertically between the second and fourth linkages, the fifth linkage comprising a first linkage assembly dual-acting hydraulic cylinder, and extending the first linkage assembly dual-acting hydraulic cylinder while the second linkage assembly hydraulic cylinder remains unactuated raises the boom from the lowered position.

13. The spreader of claim 12, wherein the at least one outer boom section is pivotable about a substantially longitudinally-oriented pivot axis to pivot the at least one outer boom section between the transversely-oriented position and the vertically-oriented position.

14. The spreader of claim 13, further comprising at least one boom section hydraulic cylinder, wherein actuation of the at least one boom section hydraulic cylinder pivots the least one outer boom section between the transversely-oriented position and the vertically-oriented position, the boom section hydraulic cylinder pivotally connected to the least one outer boom section and a non-folding section of the boom.

15. The spreader of claim 14, wherein the least one outer boom section comprises two outer boom sections situated at opposite ends of a central boom section.

16. The spreader of claim 1, wherein the at least one outer boom section is pivotable about a substantially longitudinally-oriented pivot axis to pivot the at least one outer boom section between the transversely-oriented position and the vertically-oriented position.

17. The spreader of claim 1, further comprising at least one boom section hydraulic cylinder, wherein actuation of the at least one boom section hydraulic cylinder pivots the least one outer boom section between the transversely-oriented position and the vertically-oriented position, the boom section hydraulic cylinder pivotally connected to the least one outer boom section and a non-folding section of the boom.

18. The spreader of claim 1, wherein the least one outer boom section comprises two outer boom sections situated at opposite ends of a central boom section.

* * * * *